United States Patent
Kawai et al.

(10) Patent No.: US 9,982,491 B2
(45) Date of Patent: May 29, 2018

(54) THREADED JOINT FOR OIL COUNTRY TUBULAR GOODS

(71) Applicant: JFE Steel Corporation, Tokyo (JP)

(72) Inventors: Takamasa Kawai, Tokyo (JP); Kazunari Takahashi, Tokyo (JP); Hiroshi Chikatsune, Tokyo (JP); Masaki Yoshikawa, Tokyo (JP); Jun Takano, Tokyo (JP); Takuya Nagahama, Tokyo (JP); Masateru Ueta, Tokyo (JP)

(73) Assignee: JFE Steel Corporation (JP)

( * ) Notice: Subject to any disclaimer, the term of this patent is extended or adjusted under 35 U.S.C. 154(b) by 0 days. days.

(21) Appl. No.: 14/896,754

(22) PCT Filed: Jun. 9, 2014

(86) PCT No.: PCT/JP2014/003056
§ 371 (c)(1),
(2) Date: Dec. 8, 2015

(87) PCT Pub. No.: WO2014/199620
PCT Pub. Date: Dec. 18, 2014

(65) Prior Publication Data
US 2016/0123091 A1   May 5, 2016

(30) Foreign Application Priority Data

Jun. 14, 2013 (JP) ................................. 2013-125327

(51) Int. Cl.
*E21B 17/042* (2006.01)
*F16B 33/02* (2006.01)
(Continued)

(52) U.S. Cl.
CPC ............ *E21B 17/042* (2013.01); *F16B 33/02* (2013.01); *F16L 15/004* (2013.01); *F16L 15/06* (2013.01)

(58) Field of Classification Search
CPC ......... F16L 15/00; F16L 15/004; F16L 15/06; E21B 17/08; E21B 17/042; F16B 33/02
(Continued)

(56) References Cited

U.S. PATENT DOCUMENTS 4,121,862 A * 10/1978 Greer .................... F16L 15/001
285/333
4,623,173 A * 11/1986 Handa ................... E21B 17/042
285/333
(Continued)

FOREIGN PATENT DOCUMENTS

CN       102352727      2/2012
JP       6-50476 A      2/1994
(Continued)

OTHER PUBLICATIONS

Supplementary European Search Report dated Apr. 25, 2016, of corresponding European Application No. 14811561.1.
(Continued)

*Primary Examiner* — Gregory J Binda
*Assistant Examiner* — Zachary T Dragicevich
(74) *Attorney, Agent, or Firm* — DLA Piper LLP (US)

(57) ABSTRACT

A threaded joint for an oil country tubular goods includes pins each of which occupies a pipe end portion of a steel pipe for an oil country tubular goods, and includes an externally-threaded portion, a nose extending toward a pipe end side from the externally-threaded portion, and a shoulder forming a distal end of the nose; and a box including internally-threaded portions each forming a threaded portion by being threadedly joined with the externally-threaded portion, and
(Continued)

shoulders brought into contact with the shoulders of the pins, wherein the pins and the box being joined to each other by the threaded joining so that portions between the threaded portions and the shoulders are brought into metal-to-metal contact with each other to thereby form seal portions at the contact portions, and the shoulders of the pins and the shoulders of the box forming shoulder faces are brought into contact with each other at the time of make-up of the threaded joint, and a ratio of a chamfer length of pin thread to a thread pitch is 1.0 or more to 3.0 or less.

1 Claim, 2 Drawing Sheets

(51) Int. Cl.
  *F16L 15/00* (2006.01)
  *F16L 15/06* (2006.01)
(58) Field of Classification Search
  USPC .................................................. 285/333, 334
  See application file for complete search history.

(56) References Cited

U.S. PATENT DOCUMENTS

| 6,237,967 | B1* | 5/2001 | Yamamoto | E21B 17/042 |
| | | | | 285/333 |
| 6,322,110 | B1 | 11/2001 | Banker et al. | |
| 2003/0122378 | A1 | 7/2003 | Nagasaku et al. | |
| 2003/0132633 | A1* | 7/2003 | Maeda | E21B 17/042 |
| | | | | 285/333 |
| 2005/0248153 | A1* | 11/2005 | Sugino | E21B 17/042 |
| | | | | 285/333 |
| 2006/0006647 | A1 | 1/2006 | Hashem et al. | |
| 2009/0200798 | A1* | 8/2009 | Hamamoto | E21B 17/042 |
| | | | | 285/334 |
| 2010/0078936 | A1 | 4/2010 | Nakamura et al. | |
| 2012/0286507 | A1* | 11/2012 | Maillon | F16L 15/06 |
| | | | | 285/334 |

FOREIGN PATENT DOCUMENTS

| JP | 9-126367 A | 5/1997 |
| JP | 2001-21072 A | 1/2001 |
| JP | 2002-61780 A | 2/2002 |
| JP | 2008-256023 A | 10/2008 |

OTHER PUBLICATIONS

Japanese Office Action dated Jan. 20, 2015, of corresponding Japanese Application No. 2013-125327, along with a Concise Statement of Relevance of Office Action in English.

* cited by examiner

B PORTION   A PORTION

ENLARGED VIEW OF A PORTION

ENLARGED VIEW OF B PORTION

PRIOR ART

THREADED JOINT FOR OIL COUNTRY TUBULAR GOODS

TECHNICAL FIELD

This disclosure relates to a threaded joint for oil country tubular goods having excellent galling resistance and, more particularly, to a threaded joint for oil country tubular goods having excellent galling resistance suitable for connection of steel pipes such as an OCTG (oil country tubular goods) which include, in the same category, tubes or casings used for search and production of an oil well or a gas well in general, riser pipes or line pipes.

BACKGROUND

A threaded joint has been popularly used to connect steel pipes used in a petroleum installation for oil industry such as oil country tubular goods. In connecting steel pipes used for search and production of oil or gas, conventionally, a standard threaded joint which is stipulated in API (American Petroleum Institute) standard has been typically used. However, recently, deepening of a well for crude oil or a natural gas has progressed and the number of horizontal wells and directional wells instead of vertical wells has been increasing and, hence, the drilling and production environment has become difficult. Further, the number of wells developed in an appalling circumstance such as oceans and polar regions has been increasing and, hence, the performances which threaded joints have to achieve are diversified including compression resistance, bending resistance and sealability against external pressure (external pressure resistance). In view of the above, the number of instances where a special threaded joint having high performance referred to as "premium joint" is being used have increased, and a demand for the improvement of performances of the premium joint has been also increased more and more.

A premium joint is a coupling-type joint where externally-threaded members (hereinafter referred to as "pins") each of which includes a tapered thread, a seal portion (to be more specific, a metal to metal seal portion) and a shoulder (to be more specific, a torque shoulder) and is formed on a pipe end portion, and an internally-threaded member which includes tapered threads, seal portions (to be more specific, metal to metal seal portions) and shoulders (to be more specific, torque shoulders) and connects the pins to each other (hereinafter referred to as "box") are jointed to each other. The tapered threads are important to firmly fix the pipe joint, the seal portions play a role of ensuring gas tightness by bringing the box and the pins into metal contact at such portions, and the shoulders form shoulder faces which play a role of abutments during make-up of the joint.

FIGS. 3A-3C are schematic explanatory views showing a conventional example of a premium joint for an oil country tubular goods use. FIGS. 3A-3C also include longitudinal cross-sectional views of a threaded joint of a circular pipe (a cross-sectional view where a pipe axis extends in the cross section). The threaded joint includes pins 3 and a box 1 corresponding to the pins 3. On an outer surface thereof, the pin 3 has an externally-threaded portion 7 and a nose (also referred to as a pin nose) 8 which is an elongated portion formed adjacent to the externally-threaded portion 7 on each distal end side of the pin 3 and has no threads. The nose 8 has a seal portion (to be more specific, a metal to metal seal portion) 11 on an outer peripheral surface thereof, and a shoulder 12 on an end surface thereof. The box 1 corresponding to the pins 3 has internally-threaded portions 5, seal portions 13 and shoulders 14 on an inner surface thereof, and these portions are portions being threadedly engaged with or brought into contact with the externally-threaded portions 7, the seal portions 11 and the shoulders 12 of the pins 3 respectively.

In the conventional example shown in FIGS. 3A-3C, the seal portion 11 is formed on a distal end portion of the pin 3, and desired seal performance can be realized by imparting an appropriate make up torque. However, the make up torque is influenced by a lubrication condition, a surface quality and the like. As a design of a threaded joint which does not largely depend on these factors, there has been known a radial-directional seal method (also referred to as a radial seal type) where a radial directional component of a seal contact pressure is relatively increased.

With respect to the point that the seal portion is provided at a portion different from the shoulder, the radial-seal-type threaded joint is substantially equal to the threaded joint shown in FIGS. 3A-3C having the seal portion on the distal end portion of the pin.

When the shoulder faces which play roles of stoppers are brought into contact with each other during make-up of the threaded joint, a contact reaction force in the axis direction acts on a pin pipe end side so that a maximum axial reaction force is generated on a load flank face of a threaded portion on a pin pipe end side whereby galling is liable to occur.

JP 2001-21072 A discloses a technique of preventing galling at a box end portion by decreasing a contact reaction force at the box end portion. However, a contact reaction force on a box center side, that is, on a pin pipe end side is kept high. Hence, JP '072 cannot overcome the galling on the pin pipe end side. In view of the above, it is possible that a contact reaction force can be decreased by applying the technique of JP '072 that a thread gap (a face to face gap formed between opposedly-facing stabbing flank faces) is changed by changing a pitch in the axis direction in thread cutting also to a pin pipe end side. However, the thread gap is extremely small in the first place and there are variations in pitch in the axis direction. Hence, it is difficult to industrially carry out the fine adjustment of the thread gap.

There is also the drawback that it is difficult to provide a threaded joint for an oil country tubular goods having excellent galling resistance at a threaded portion on a pin pipe end side as industrial products.

SUMMARY

We found that a contact reaction force at a threaded portion on a pin pipe end side at the time of make-up of a threaded joint can be decreased by appropriately setting a chamfer length of pin thread so that galling can be prevented.

"Chamfer length of pin thread" is a length in the pipe axis direction of a pin thread chamfer portion 40 (see FIG. 1) which is a shaved-off portion when a threaded portion (externally-threaded portion) on a pin pipe end side is shaved off at a constant cutting angle usually at a final stage of threading. The constant cutting angle is referred to as a chamfer angle, and is defined by an inclination angle θ (an acute angle) from a plane which intersects with a pipe axis orthogonally.

We thus provide:

(1) A threaded joint for an oil country tubular goods having excellent galling resistance includes: pins each of which occupies a pipe end portion of a steel pipe for an oil country tubular goods, and includes an externally-threaded portion, a nose which extends toward a pipe end side from the externally-threaded portion, and a shoulder forming a distal end of the nose; and a box which includes internally-threaded portions each forming a threaded portion by being threaddedly joined with the externally-threaded portion, and shoulders which are brought into contact with the shoulders of the pins, the pins and the box being joined to each other by the threaded joining so that portions between the threaded portions and the shoulders are brought into metal-to-metal contact with each other thus forming seal portions at the contact portions, and the shoulders of the pins and the shoulders of the box forming shoulder faces which are brought into contact with each other at the time of make-up of the threaded joint, wherein a ratio of a chamfer length of pin thread to a thread pitch is set to 1.0 or more to 3.0 or less.

It is possible to acquire a threaded joint for an oil country tubular goods which can be industrially produced easily and has excellent galling resistance.

REFERENCE SIGNS LIST

Figure 1:
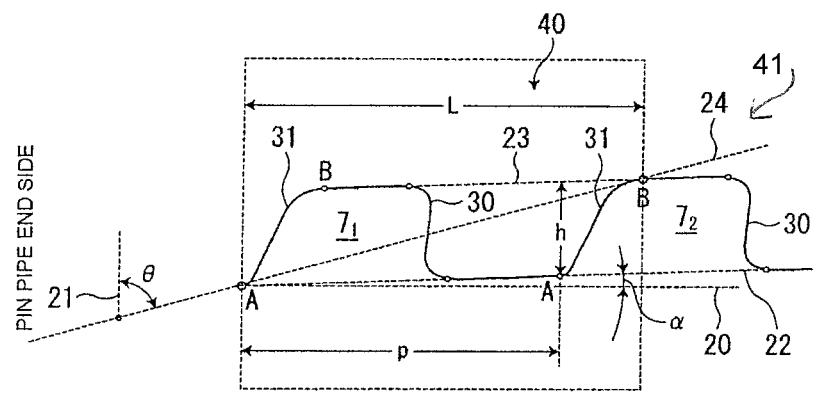
FIG. 1 is schematic explanatory view showing one example of a threaded joint for an oil country tubular goods according to an example.

1: box
3: pin
5: internally-thread portion (box side)
7: externally-thread portion (pin side)
$7_1$: first pin thread ridge
$7_2$: second pin thread ridge
8: nose portion (pin nose)
11, 13: seal portion (metal to metal seal portion)
12: shoulder (pin side)
14: shoulder (box side)
20: parallel line of tube axis
21: orthogonal line of tube axis
22: base line at a root of thread position
23: base line at a thread ridge top position
24: shave-off limit line
30: load flank face
31: stabbing flank face
40: pin thread chamfer portion
41: non-chamfered portion

DETAILED DESCRIPTION

FIG. 1 is a schematic explanatory view showing one example of a threaded joint for an oil country tubular goods according to an example. To be more specific, FIG. 1 is a longitudinal cross-sectional view of a threaded portion (externally-threaded portion) of a pin pipe end and the surrounding of the threaded portion.

In FIG. 1, symbol 20 indicates a parallel line of tube axis, symbol 21 indicates an orthogonal line of tube axis, symbol 22 indicates a base line at a root of thread position, symbol 23 indicates a base line at a thread ridge top position, symbol 24 indicates a shave-off limit line, symbol 30 indicates a load flank face, symbol 31 indicates a stabbing flank face, symbol 40 indicates a pin thread chamfer portion, symbol L indicates a chamfer length of pin thread, symbol θ indicates a chamfer angle, symbol α indicates a thread taper angle, symbols $7_1$ and $7_2$ indicate a first pin thread ridge and second pin thread ridge which are first and second thread ridges as counted from a pin pipe end side, respectively, symbol h indicates a thread height, symbol p indicates a thread pitch, and point A and point B indicate a rise start point and a rise finish point of a stabbing flank face 31 of each thread ridge of each pin, respectively. The base line 22 of the root of thread position and the base line 23 of the thread ridge top position are arranged parallel to each other. The thread taper angle α is an intersecting angle (an acute angle) made by the parallel line of tube axis 20 and the base line 22 of the root of thread position. The thread height h is a pipe radial direction distance between the base line 22 of the root of thread position and the base line 23 of the thread ridge top position. The thread pitch p is a pipe axis direction distance between points A of the neighboring thread ridges of the pin (for example, the first pin thread ridge $7_1$ and the second pin thread ridge $7_2$). The chamfer angle θ is an inclination angle which a shave-off limit line 24 makes with the orthogonal line of tube axis 21. When a convergence point of a chamfer angle range, an angle range of the chamfer angle θ, is placed at the point A of the first pin thread ridge $7_1$, a portion of the externally-thread portion 7 which enters the inside of the chamfer angle range becomes a portion which is a portion of the thread ridge to be shaved off, that is, a pin thread chamfer portion 40. A pipe axis direction length of the pin thread chamfer portion 40 is a chamfer length of pin thread L. An intersection point of the shave-off limit line 24 and the base line 23 of the thread ridge top position becomes an end point of the pin thread chamfer portion 40 on an opposite side to the pipe end and start point of the non-chamfered portion 41.

In this example, when the end point and the point B of the second pin thread ridge $7_2$ agree with each other is illustrated. However, the end point does not always agree with the point B of the second pin thread ridge $7_2$, and there may be a situation where the end point agrees with any one point on a thread ridge profile line from the point B of a certain one pin thread ridge to a fall end point of the load flank face 30.

A ratio of the chamfer length of pin thread L to the thread pitch p (abbreviated as a chamfer length ratio) L/p is set to 1.0 or more to 3.0 or less. Next, the reason of setting the chamfer length ratio L/p to such a value is described.

A portion of the externally-thread portion 7 where a portion of the pin thread ridge is shaved off constitutes an incomplete thread portion having an incomplete thread shape. The incomplete thread portion has lower stiffness than a complete thread portion which is a portion having a complete thread shape contiguously formed with an opposite pipe end side. Hence, the incomplete thread is liable to be deformed at the time of make-up of the externally-thread portion 7 with the internally-thread portion 5. As a result, a contact reaction force is dispersed in the thread portion length direction and lowered, and the larger the length of the incomplete thread portion, the larger a contact reaction force decreasing effect becomes. On the other hand, when the chamfer length ratio L/p is less than 1.0, the contact reaction force decreasing effect becomes insufficient, while when the chamfer length ratio L/p exceeds 3.0, the increase of the contact reaction force decreasing effect reaches saturation and a cutting time is wastefully extended. Accordingly, the chamfer length ratio L/p is set to a value which falls within a range of 1.0 to 3.0, due to which, a contact reaction force of the threaded portion on a pin pipe end side is decreased so that galling resistance of the threaded joint can be enhanced.

Figure 2:
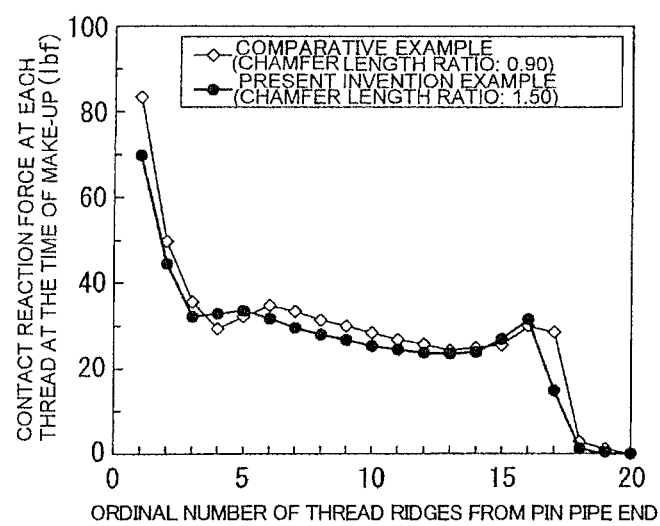
FIG. 2 is a graph showing a contact reaction force at each pin thread ridge at the time of make-up of the threaded joint.
Figure 3A:
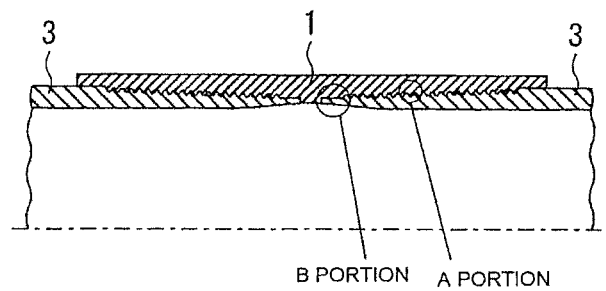
FIGS. 3A-3C are schematic explanatory views showing an example of a conventional special threaded joint.
Figure 3B:
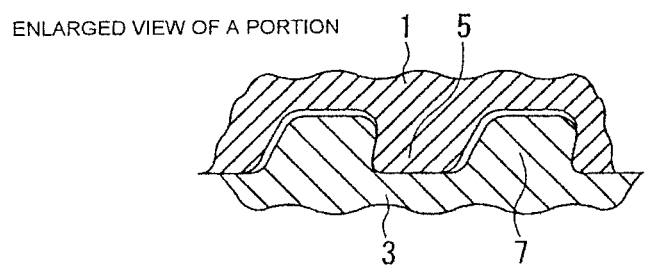
Figure 3C:
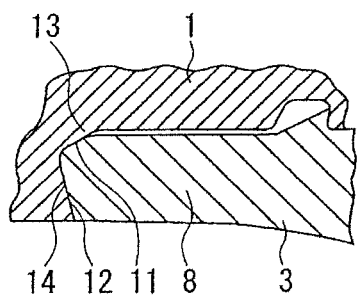

FIG. 2 is a graph showing the result obtained by preparing threaded joints where the number of pin thread ridges is 20 and the chamfer length ratio L/p is set at two levels consisting of 0.90 (comparative example) and 1.50 (our example) and other thread shape conditions are set equal, and by calculating, using an FEA (finite element analysis), a contact reaction force for each pin thread ridge at the time of performing thread make-up of respective screws. It is understood from FIG. 2 that our example can decrease a contact reaction force at the thread portion on a pin pipe end side more effectively than the comparative example.

In FIG. 1, formula (1) holds based on the geometric relationship.

$$h = L \times (1/\tan\theta - \tan\alpha) \quad (1)$$

In formula (1), formula (2) is obtained by modifying formula (1) by substituting L with m×p.

$$h/(m \times p) = 1/\tan\theta - \tan\alpha \rightarrow 1/\tan\theta = \tan\alpha + h/(m \times p) \rightarrow \tan\theta = 1/\{\tan\alpha + h/(m \times p)\} \rightarrow \theta = \tan^{-1}[1/\{\tan\alpha + h/(m \times p)\}] \quad (2)$$

From formula (2) and the requirements that L/p=m=1.0 to 3.0, it is sufficient to set the chamfer angle θ so as to satisfy formula (3).

$$\tan^{-1}[1/\{\tan\alpha + h/(1.0 \times p)\}] \leq \theta \leq \tan^{-1}[1/\{\tan\alpha + h/(3.0 \times p)\}] \quad (3)$$

Under the current technical level of threading, the chamfer angle θ which satisfies formula (3) can be relatively easily set. Hence, it is possible to acquire a threaded joint for an oil country tubular goods having excellent galling resistance which can be easily produced industrially.

EXAMPLES

With respect to a threaded joint for an oil country tubular goods which includes: pins formed by applying threading to pipe end portions of a steel pipe having an outer diameter of 9⅝" (inch) and a wall thickness of 0.545" (inch) and; a box corresponding to the pins and has pin thread shapes and pin thread chamfer shapes at levels shown in Table 1, a Make & Break test in which make-up and releasing of make-up are repeatedly performed is carried out in accordance with ISO 13679:2002. The test conditions are set such that a thread interference quantity is "High" (0.305 mm), a seal interference quantity is "High" (1.016 mm) and a make up torque is "High" (50,000 N·m). The seal interference quantity is a value which is twice as large as a largest value of a size in the pipe radial direction (a value per diameter) of a region where a portion which becomes a pin-side seal portion and a portion which becomes a box side seal portion interfere with each other when a pin drawing and a box drawing are overlapped to each other such that their pipe axes and their shoulders agree with each other. The thread interference quantity is a value which is twice as large as a size in the pipe radial direction (a value per diameter) of a region where a portion which becomes a pin side threaded portion and a portion which becomes a box side threaded portion interfere with each other in such overlapping. Further, in Table 1, "taper (diameter)" in the column "pin thread shape" is an amount of change in diameter of the threaded portion per 1 inch length of the threaded portion, and is a value which is expressed by 2 tan α when the thread taper angle α is used.

The result of the test is shown in Table 1. As shown in Table 1, galling is not generated at any levels with respect to our examples so that our examples have passed the Make & Break test.

TABLE 1

| | Pin thread shape | | | | Pin thread chamfer shape | | | | |
|---|---|---|---|---|---|---|---|---|---|
| Level No. | Taper (diameter) [inch] | Thread taper angle α [degree] | Thread pitch p [inch] | Thread height h [inch] | Chamfer angle θ [degree] | Chamfer length L [inch] | Ratio L/p [—] | Make & Break test result | Remarks |
| 1 | 0.0625 | 1.79 | 0.200 | 0.060 | 72 | 0.204 | 1.02 | Passed test through 4 passes without galling | Our example |
| 2 | 0.0625 | 1.79 | 0.200 | 0.060 | 75 | 0.253 | 1.27 | Passed test through 4 passes without galling | Our example |
| 3 | 0.0625 | 1.79 | 0.200 | 0.060 | 80 | 0.414 | 2.07 | Passed test through 4 passes without galling | Our example |
| 4 | 0.0625 | 1.79 | 0.200 | 0.060 | 82 | 0.549 | 2.75 | Passed test through 4 passes without galling | Our example |
| 5 | 0.0625 | 1.79 | 0.200 | 0.060 | 60 | 0.110 | 0.55 | Galling occurred in the 2nd pass | Comparative example |
| 6 | 0.0625 | 1.79 | 0.200 | 0.060 | 70 | 0.180 | 0.90 | Galling occurred in the 3rd pass | Comparative example |

Note:
L = h/(1/TAN(RADIANS(θ)) − TAN(RADIANS(α)))

The invention claimed is:

1. A threaded joint for oil country tubular goods comprising:
pins each of which occupies a pipe end portion of a steel pipe for an oil country tubular goods, and includes an externally-threaded portion, a nose extending toward a pipe end side from the externally-threaded portion, and a shoulder forming a distal end of the nose; and
a box including internally-threaded portions each forming a threaded portion by being threadedly joined with the externally-threaded portion, and shoulders brought into contact with the shoulders of the pins,
wherein
the pins and the box being joined to each other by the threaded joining so that portions between the threaded portions and the shoulders are brought into metal-to-metal contact with each other to thereby form seal portions at portions of contact, and the shoulders of the pins and the shoulders of the box forming shoulder faces are brought into contact with each other at the time of make-up of the threaded joint, a pin thread chamfer portion formed on the externally-threaded portion of a pin pipe end side by being shaved off at a constant cutting angle at a final stage of threading, the pin thread chamfer portion being a taper portion between a rise start point of a stabbing flank face of a first thread ridge from the pipe end side and a non-chamfered portion of the externally-threaded portion, wherein a diameter of the taper portion at an end connecting with the nose is the same as a diameter of the nose, and a diameter of the taper portion at an end connecting with the non-chamfered portion is the same as a diameter of the non-chamfered portion, and a ratio of an entire chamfer length of pin thread to a thread pitch is 1.0 to 3.0, the entire chamfer length of the pin thread being a length in a pipe axis direction of the pin thread chamfer portion.

* * * * *